Oct. 20, 1953  H. G. KORNBERG  2,656,072
DEVICE FOR MIXING AND FEEDING FERTILIZER
Filed June 23, 1950  5 Sheets-Sheet 1
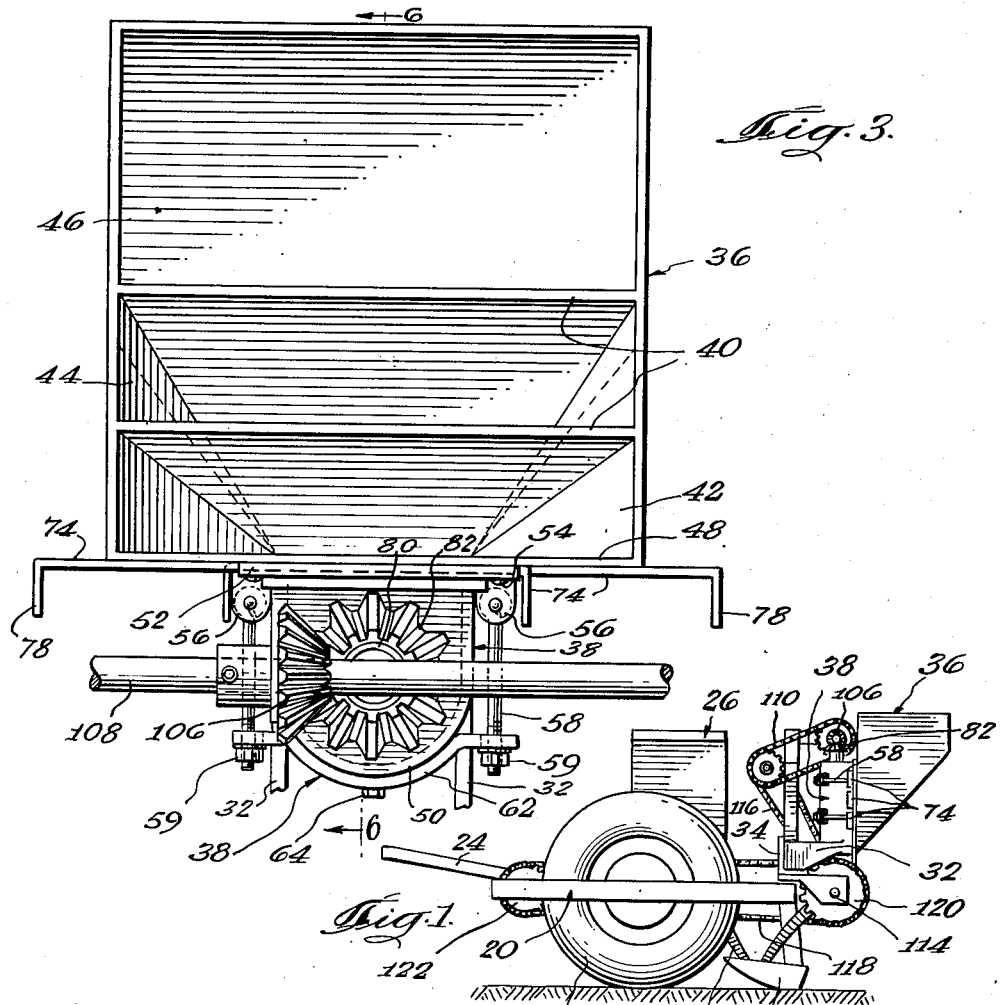
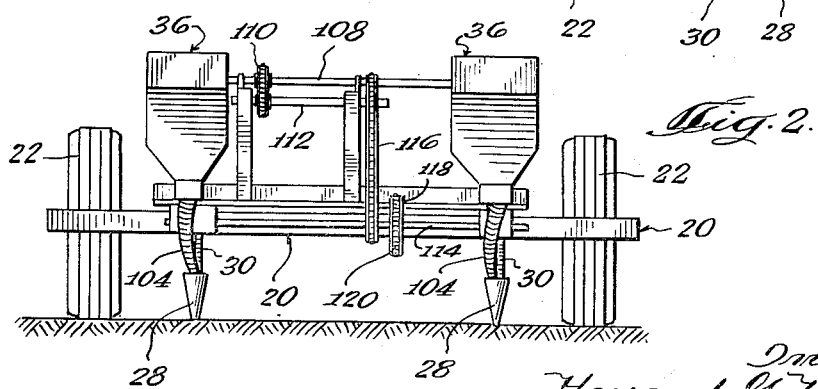
Inventor
Howard G. Kornberg
By
Mann, Brown & Hausmann
Attorneys

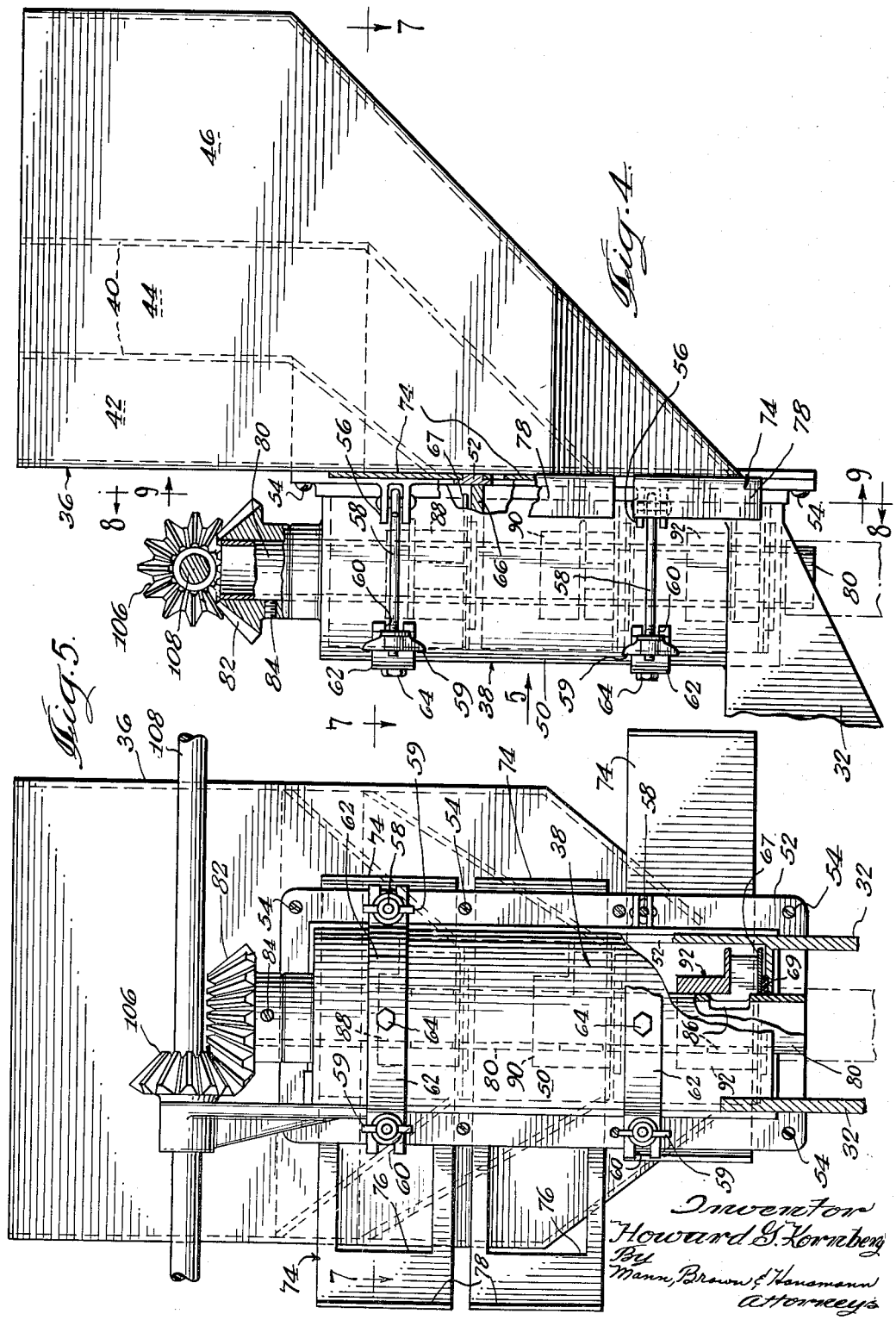

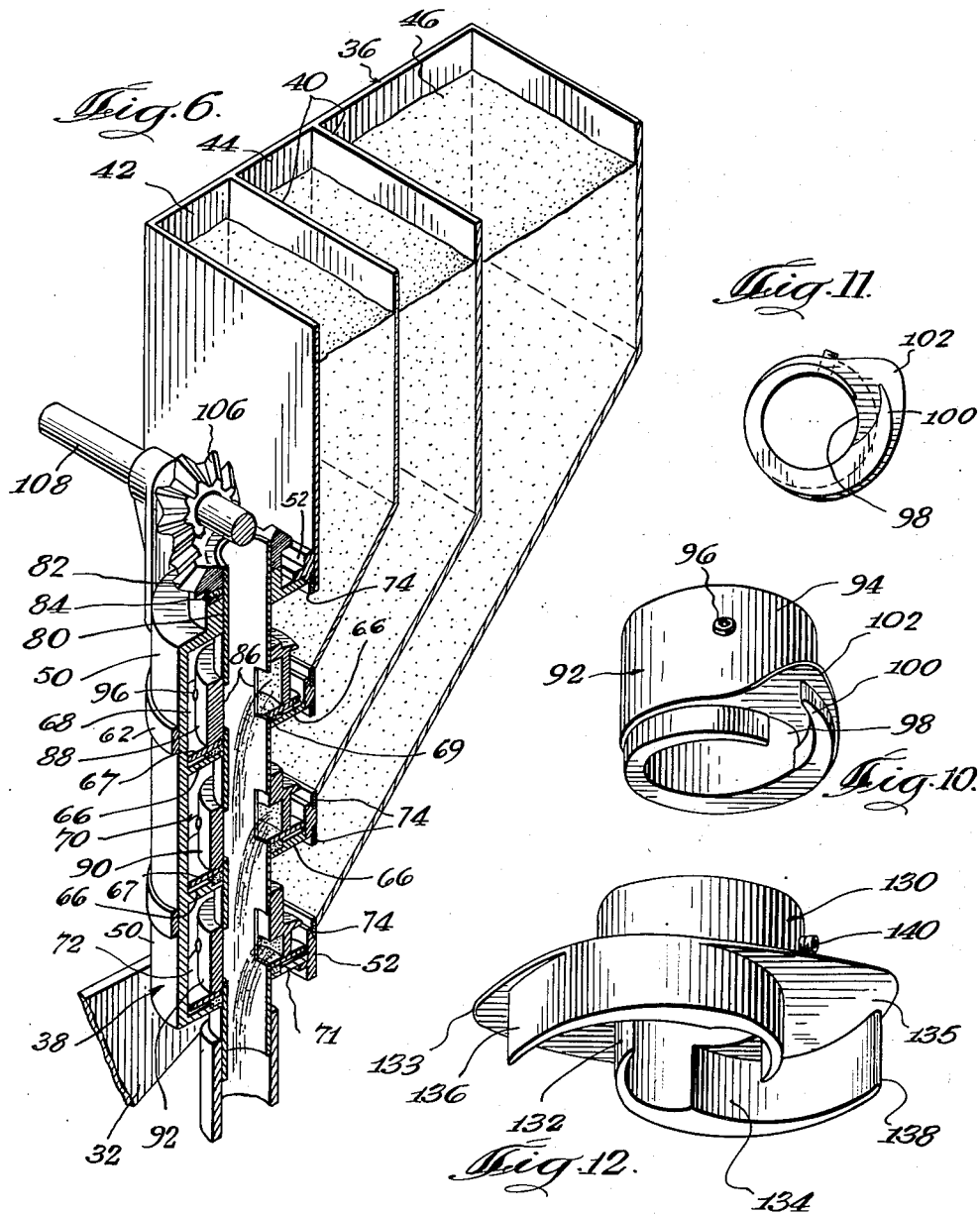

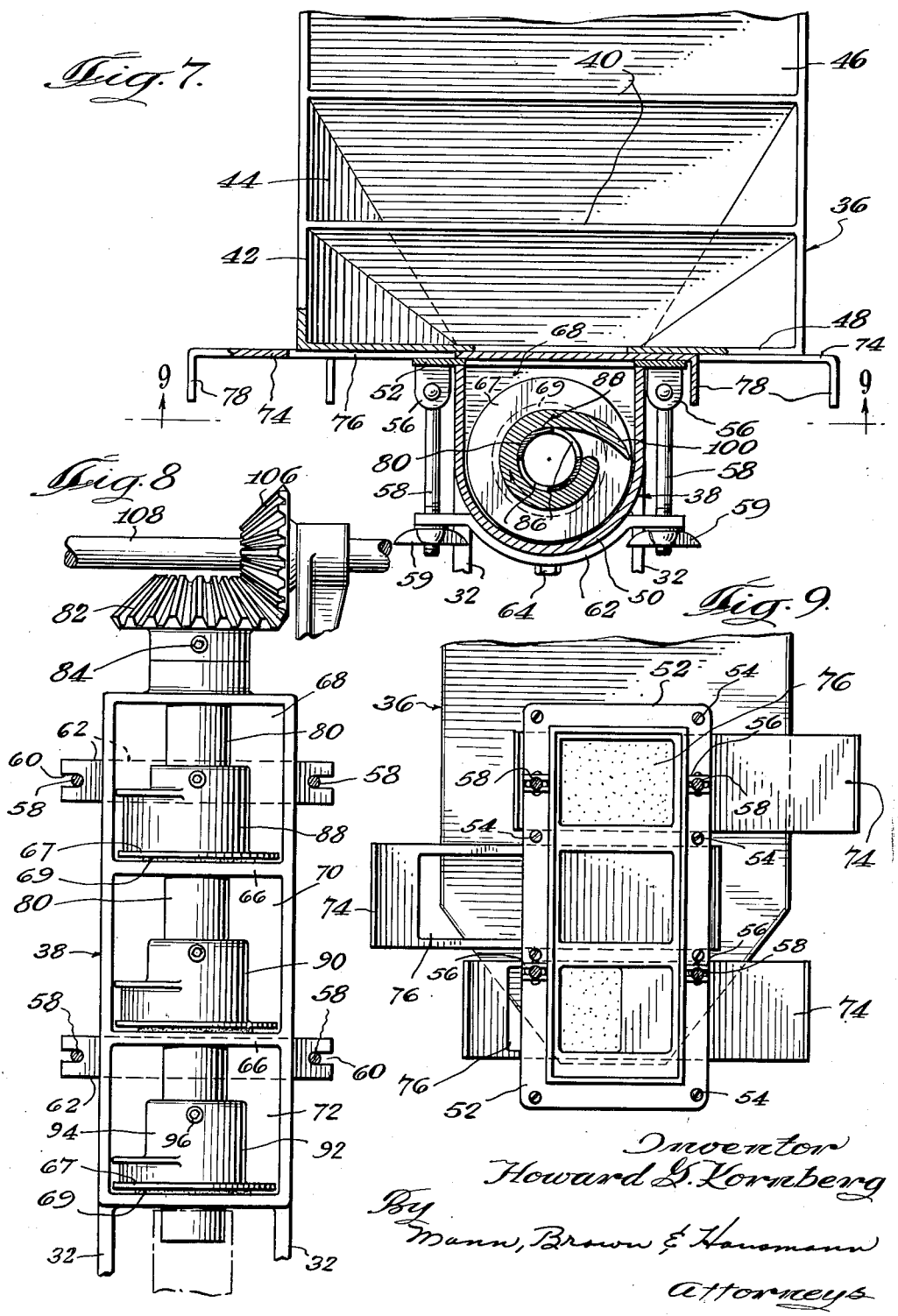

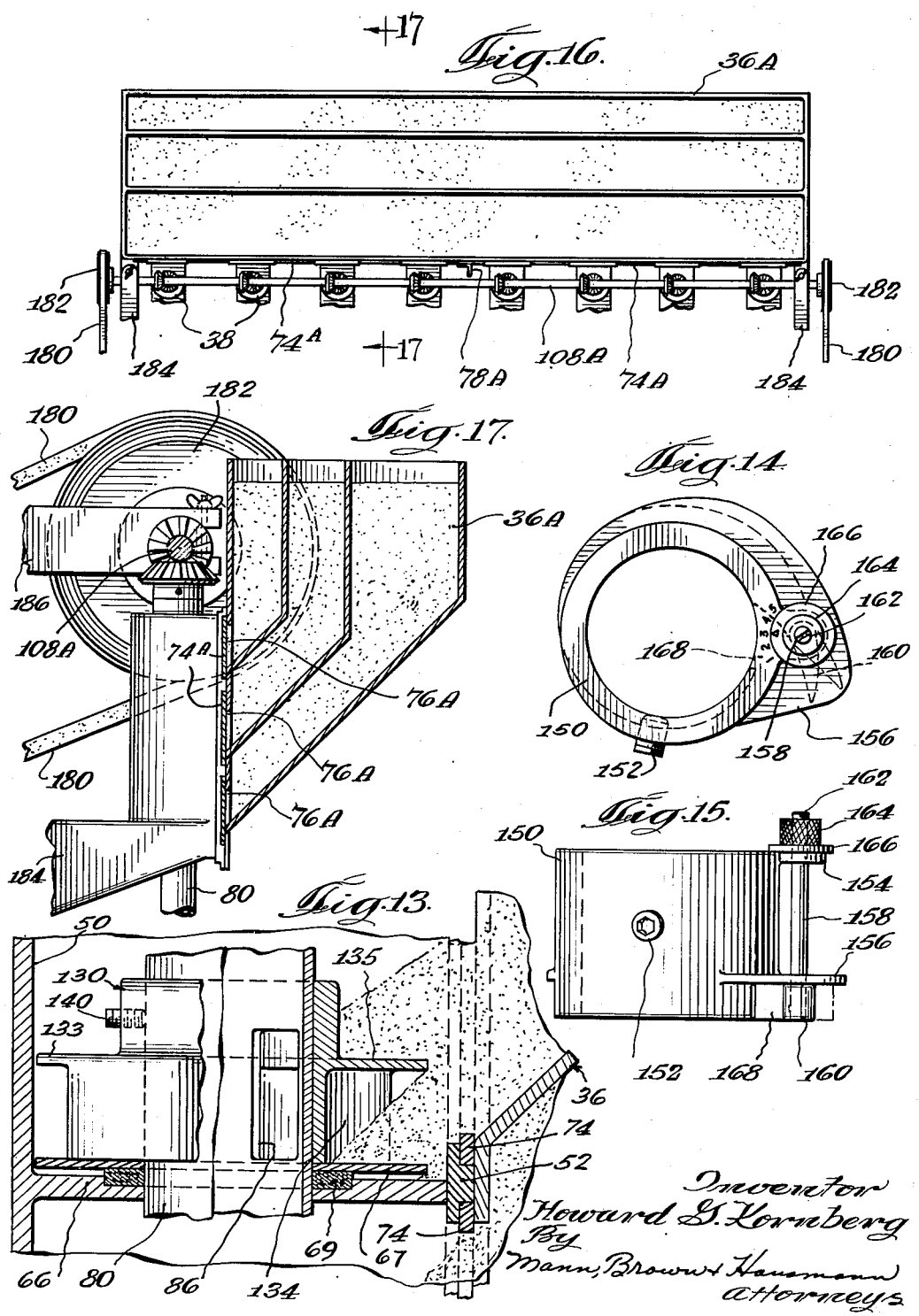

Patented Oct. 20, 1953

2,656,072

UNITED STATES PATENT OFFICE 2,656,072

DEVICE FOR MIXING AND FEEDING FERTILIZER

Howard G. Kornberg, Fargo, N. Dak.

Application June 23, 1950, Serial No. 169,824

12 Claims. (Cl. 222—134)

My invention relates to a device for mixing and feeding fertilizer and is more particularly concerned with a device adapted to be attached to farm machines such as seeders, grain drills, and similar agricultural implements, for delivering the mixed fertilizer directly into the rows in which the seeds or grain are planted.

The great bulk of fertilizer used by American farmers is commercial fertilizer in which the basic ingredients are potash, phosphate, and nitrate or boron. In current practice these ingredients and possibly others are mixed in large and expensive mixing plants located in various cities scattered throughout the country. Each mixing plant produces a commercial fertilizer having a predetermined ratio of basic ingredients and this ratio is marked upon the bags in which the fertilizer is ordinarily sold.

The modern farmer has the soil of each field to be cultivated analyzed by the county agent who specifies the fertilizer requirements of each field in terms of these basic fertilizer ingredients. The farmer takes these analyses of his several fields to a store selling fertilizer and there purchases suitable amounts of commercial fertilizers whose mixtures of basic ingredients most nearly approximate the fertilizer needs of his respective fields.

Since it rarely happens that the fertilizer needs of any particular field correspond identically with the ratio of basic ingredients in any commercial fertilizer, the farmer must buy sufficient commercial fertilizer so that the minimum amount of each basic ingredient is at least equivalent to the minimum needs of a particular field. In order to get this minimum requirement of each ingredient, excess quantities of other ingredients will be included in the mixture constituting the commercial fertilizer purchased and the presence of such excess ingredients will unnecessarily add to the cost of the fertilizer. Furthermore, the cost of building and operating the expensive mixing plant and of transporting the basic ingredients from their sources of supply to the mixing plant and thence to the farmer's local retail store are reflected in the cost of the fertilizer and materially increase the expense to the farmer of providing his fields with adequate soil enrichment.

Because of chemical reaction between some of the ingredients of commercial fertilizer, it frequently happens that by the time a commercial mix is purchased by the farmer, this mix has hardened into a rock-like mass which must be broken by means of a hammer or similar tool into small particles before it can be utilized. This is a further disadvantage of the present method of preparing and distributing commercial fertilizers.

An object of my invention is to overcome these difficulties and disadvantages of the prior art by making possible a simpler, more efficient, and more economical distribution of the basic fertilizer ingredients directly to the individual farmer.

Another object of my invention is to provide a new and improved device which can be used by the individual farmer for automatically mixing and delivering to the field a predetermined mixture of fertilizer ingredients.

Another object of my invention is to provide a new and improved device of the kind described which can be readily set to change the proportion of fertilizer ingredients to correspond identically with the needs of any particular field.

Another object of my invention is to provide a compact and inexpensive device of the kind described which can be readily attached to planters, seeders, and grain drills of the kinds now in common use.

Another object of my invention is to provide my new and improved mixing and feeding device in a form which may be utilized either as an attachment to existing implements or as a separate implement for mixing and spreading fertilizer.

A further object of my invention is to provide new and improved device of the foregoing type which can be utilized either as an attachment for existing implements or as a separate implement.

A still further object of my invention is to provide new and improved means for controlling the quantity of each individual ingredient forming a part of the fertilizer mix.

Other objects and advantages will become apparent as the description proceeds.

In the drawings:

Fig. 1 is a side elevational view of a preferred form of my invention attached to a seeder of conventional design;

Fig. 2 is a rear elevational view of the device shown in Fig. 1;

Fig. 3 is a top plan view of a mixing and feeding device shown in Figs. 1 and 2;

Fig. 4 is a side elevational view of the mixing and feeding device shown in Fig. 3;

Fig. 5 is a front elevational view of the mixing and feeding device shown in Fig. 4 and is taken looking in the direction of the arrow 5 of Fig. 4;

Fig. 6 is a perspective view taken on the plane of the line 6—6 of Fig. 3;

Fig. 7 is a horizontal sectional view taken on the line 7—7 of Fig. 4;

Fig. 8 is a vertical sectional view taken on the line 8—8 of Fig. 4;

Fig. 9 is a vertical sectional view taken on the line 9—9 of Fig. 4;

Fig. 10 is a perspective view of feed regulating collars;

Fig. 11 is a bottom view of the collar of Fig. 10;

Fig. 12 is a perspective view of a second type of collar having two feeding ports and fingers therefor;

Fig. 13 is a fragmentary vertical, sectional view showing an assembly embodying the collar of Fig. 12;

Fig. 14 is a top plan view of a collar having an adjustable feeding finger;

Fig. 15 is a side elevation of the adjustable collar of Fig. 14;

Fig. 16 is a top plan view of a second preferred embodiment of my invention in which a single hopper is provided with a plurality of mixing and feeding mechanisms; and Fig. 17 is a vertical sectional view taken on the line 17—17 of Fig. 16.

In Figs. 1 and 2 of the drawings I have illustrated a conventional seeder having a frame 20 mounted on wheels 22 and provided with a tongue 24 for attachment to a tractor or other source of motive power. The usual seed bin is indicated at 26 and is provided with conventional feeding mechanism for delivering the seeds to shoes 28 through flexible tubes 30. It will be understood that this seed-feeding mechanism is operated by the forward movement of the implement in any usual manner.

A bracket 32 is attached near each end to the angle iron 34 forming a cross member of the implement frame. Each bracket 32 carries a preferred embodiment of my invention. This embodiment is in the form of an attachment comprising a hopper indicated generally at 36 and mixing and feeding mechanism indicated at 38.

The hopper 36 is provided with partitions 40 which may be of any suitable number to divide the hopper into enough individual bins or compartments so that each fertilizer ingredient will have a separate bin. It will be further understood that any desired arrangement of partitions may be provided to make the individual bins of any desired relative size. In the particular embodiment shown, the hopper 36 is provided with two partitions 40 dividing it into three bins 42, 44, and 46 since this embodiment is designed to mix and feed a fertilizer mixture formed of three basic ingredients. The forward end 48 of the hopper 36 is attached in any suitable manner to a generally semicylindrical casing 50 forming a part of the mixing and feeding mechanism.

In the particular form of the invention shown, a plate 52 is secured by screws 54 to the end 48 of the hopper 36. This plate 52 is provided with two pairs of ears 56 to which bolts 58 are pivotally secured. The other ends of these bolts are adapted to extend through slots 60 in the ends of straps 62 and are secured therein by wing nuts 59. The straps 62 are secured to the casing 50 by bolts 64.

The casing 50 is provided with partitions 66 which divide this casing into three compartments 68, 70, and 72 corresponding to the bins 42, 44, and 46 respectively and communicating with the tapered lower ends of these bins through openings formed in the plate 52. Each of these openings is controlled by a slide 74 as best shown in Fig. 9. In this figure the upper slide is shown in the fully open position, the lower slide in an intermediate position, and the center slide in fully closed position.

It will be understood that the fertilizer ingredients are in powdered or granular form and when placed in the bins 42, 44, and 46 respectively will flow under the action of gravity downwardly in these bins and through the openings 76 in slides 74 to the respective compartments 68, 70, and 72 in the casing 50 of the mixing and feeding mechanism. It will be further understood that the action of gravity in creating and maintaining this downward flow of the fertilizer ingredients is aided and assisted by the vibration resulting from movement of the implement as it is pulled along by a tractor or other source of motive power. The slides 74 are preferably in closed position when the machine is being moved from the barn to a field or from one field to another, but ordinarily will be left in open position throughout the seeding and fertilizing of a single field, even though the seeding and fertilizing operation may be interrupted at various times. The slides 74 are provided with forwardly directed ends 78 to facilitate shifting them between open and closed position.

A vertically disposed tube 80 is rotatably mounted in casing 50 and is driven through a bevel gear 82 attached to its upper end in any suitable manner such as a set screw 84. This tube has a pair of diametrically opposed openings 86 located in each of the three compartments of the casing 50. Feeding collars 88, 90, and 92 are located in the compartments 68, 70, and 72, respectively, and each of these collars encloses and covers the openings 86 located in its respective compartment. A typical collar 92 is shown more clearly in Figs. 10 and 11 and comprises an upper sleeve 94 adapted to be affixed to the tube 80 by a set screw 96 so that the collar will rotate with the tube. Each collar has an opening 98 providing a communication between its compartment and one of the tube openings 86 therein and each collar is provided with a finger 100 which directs the fertilizer ingredients through such opening and into the tube 80 when the tube and collar are rotated. A flange or roof 102 overlies the opening 98 and finger 100 and is of such extent that when the mechanism is at rest the fertilizer ingredients will not flow by gravity through the openings 98 and into the tube 80. This feature makes it possible to stop the implement in the middle of a field or elsewhere and let it stand without the necessity of closing the slides 74 in order to prevent wastage of fertilizer. It is only necessary to close the slides 74 where vibration resulting from movement of the implement might cause fertilizing material to flow through passages 98 into tube 80.

It will be noted that the flange or roof 102 of collar 92 is lower than the corresponding roof of collar 90. This means that the passage and finger of collar 90 are higher than the corresponding passage 98 and finger 100 of collar 92. In other words, more of the ingredient in bin 44 is supplied to tube 80 for each revolution thereof than is supplied of the ingredient in bin 46.

It will be further noted that the flange or roof 102 of collar 88 is still higher than that of collar 90 so that an even larger amount of the ingredient of bin 42 is delivered to tube 80 during each revolution thereof.

The several ingredients fed into the tube 80 by the several collars 88, 90, and 92 fall downward therein and are mixed and delivered in ratios determined by the relative heights of the passages 98 in the respective collars. In this particular embodiment of my invention the lower end of the tube 80 communicates with a flexible hose or pipe 104 leading to a shoe 28 from which the fertilizer mixture and seeds pass into the row.

It will be noted that the feeding collars are preferably not mounted directly on the partitions 66 of the casing 50. Instead, these collars rotate in contact with wear plates 67 of hardened material, and washers 69 of rubber, leather or other suitable material are preferably interposed between the wear plate 67 and the partitions 66 and lower end 71 of the casing 50.

Any suitable means may be provided for driving the mixing and feeding tube 80. In this particular embodiment the bevel gear 82 attached to the upper end of this tube meshes with a bevel gear 106 on a horizontal shaft 108 journaled in suitable brackets. This shaft is driven through chain and sprocket mechanism 110 by a countershaft 112 which in turn is driven from a rear transverse shaft 114 through chain and sprocket mechanism 116. A chain 118 connects sprocket 120 on this transverse shaft 114 with a sprocket 122 associated with or driven by the feeding mechanism of the seeder.

The particular seeder shown is of the two-row type and I have illustrated this seeder as being provided with two of my novel devices for mixing and feeding fertilizer, both devices being driven from the common shaft 108. It will be understood that where this form of my invention is applied to a seeder or planter for supplying a plurality of rows that such seeder or planter is provided with one of my novel devices or attachments for each of the plurality of rows.

It will be understood that in the form of my invention just described the former will be described with a plurality of feeding collars having different size openings so that by selecting the appropriate size collar for each of the compartments 68, 70, and 72 any desired ratio of the ingredients supplied to these compartments from the bins 42, 44, and 46 respectively can be secured. The feeding collars can be readily removed and changed by the following procedure. The set screw 84 is unscrewed to permit the tube 80 to be drawn downwardly and out of the casing 50. With the slides 74 in closed position, the hopper 36 is then removed from the casing 50 by releasing wing nuts 59 and swinging bolts 58 out of the slots 60 in the ends of strap 62. Plate 52 and hopper 36 may now be moved away from casing 50 to expose the open side of this casing shown in Fig. 8, and permit the withdrawal and replacement of the feeding collars to give any desired change in the ratio of fertilizer ingredients. After the collars have been changed, the tube 80 is reinserted into the casing 50 and through the collars and attached to bevel gear 82 by set screw 84. The hopper 36 and its associated plate 52 are again attached to the strap 62 by bolts 58 and wing nuts 59 and the device is then in condition to operate at the new mixing ratio.

In some instances it may be desirable to feed a particular ingredient at a faster rate than can be provided by a collar having a single feeding passage. In such instances a collar like collar 130 of Fig. 12 may be used. This form of collar has two passages 132 and 134, each provided with a feeding finger 136 and 138 respectively. The passages 132 and 134 are diametrically opposite and adapted to communicate with the diametrically opposite openings 86 in the tube 80. Each of the passages 132 and 134 is covered by a roof 133 and 135 respectively. A set screw 140 is provided to affix the collar 130 to the tube 80 for rotation therewith. In the fragmentary sectional view of Fig. 13 I have shown a typical installation of a double feed collar like that shown in Fig. 12. This view graphically illustrates the manner in which the roof 135 overhangs its passage 134 to such an extent that the fertilizer ingredient attains a natural angle of inclination or angle of rest before it can enter an opening 86 into the tube 80. As heretofore pointed out, this feature is common to all of the feeding collars and permits the implement to stand idle without the necessity of closing the slides 74. It will be understood that the double passage collars of Fig. 12 may also be made with different height passageways to give different capacities in the same manner in which the collars of Figs. 10 and 11 are varied for this purpose.

In lieu of providing a plurality of different collars having different size openings or different numbers of openings, the same result may be achieved by providing a single form of collar having an adjustable feeding finger. This adjustable type of collar is shown in Figs. 14 and 15 and comprises a sleeve 150 adapted to be affixed to the shaft 80 by a set screw 152. An ear 154 and roof 156 provide bearings for a shaft 158 having a movable finger 160 attached to the lower end thereof. The position of the finger 160 may be changed by inserting a screwdriver in the curf 162 in the upper end of shaft 158 and then the finger may be locked in this position by retaining nut 164.

A washer 166 turns with the shaft 158 and has an arrow which cooperates with the numbered indicia shown in Fig. 14 to indicate the position of the feeding finger 160. This finger directs material into the passage 168 which is adapted to register at its inner end with one of the openings 86 in the tube 80.

My invention is not limited to utilization with seeders and planters but may be applied to grain drills and other farm implements or machines. However, in grain drills the rows are only six inches apart and since each grain drill ordinarily supplies a large number of rows, it will usually be more economical to apply to grain drills a modified form of my invention in which a common hopper is provided for a plurality of mixing and feeding mechanisms rather than a plurality of individual assemblies of hoppers and mixing and feeding mechanisms of the kind heretofore described. In Figs. 16 and 17 I have illustrated a modified form of my invention particularly adapted for use with grain drills.

In this form of my invention the hopper 36–A extends substantially the full width of the machine and supplies fertilizer ingredients to a plurality of my novel mixing and feeding mechanisms 38. These mechanisms are driven through a common cross shaft 108–A connected by belts 180 and pulleys 182 with suitable rotating parts of the grain feeding mechanism. The hopper 36–A is attached to suitable brackets 184 and straps 186, the latter also providing bearings for the shaft 108–A. The lower ends of the tubes 80 may discharge directly to the soil or into flexible tubing as desired. In that form of my invention shown in Figs. 16 and 17, individual slides like the slide 74 could be provided for each mixing and feeding mechanism 38. I prefer however to provide continuous slides 74–A which extend the full width of the hopper 36–A and have a forwardly directed, centrally located, handle portion 78-A corresponding generally to the forwardly directed end 78 of the slide 74 for shifting the slides between open and closed position. Each of these slides is provided with a plurality of individual openings 76-A, each opening cooperating with one of the mixing and feeding mechanisms 38 to control communication between such mechanism and the hopper 36-A.

Instead of being used as an attachment for an existing implement such as a grain drill, the embodiment of my invention shown in Figs. 16 and 17 may also be mounted upon an independent frame supported on wheels and constituting a separate and independent implement functioning solely as a fertilizer mixing and spreading machine.

From the foregoing description of preferred embodiments of my invention it will be apparent that I have provided a simple and novel device for mixing and feeding fertilizer and that this device may be inexpensively manufactured in a sturdy and trouble-free form for use by the individual farmer either as an attachment for conventional farm implements or as an independent fertilizer mixer and spreader. By thus providing the individual farmer with simple and effective means for mixing in any desired ratios the basic fertilizer ingredients, it becomes possible to eliminate the expensive mixing plants and supply directly to retail outlets in farming communities the basic fertilizer ingredients at a minimum of transportation and other expense.

The farmer can purchase at such retail outlets only such amounts of each basic ingredient as called for by his requirements and by selecting the desired sizes of feeding collars or the desired finger positions of adjustable feeding collars, he can predetermine the ratio of ingredients to each individual field in accordance with its needs as determined by the soil analysis. This avoids the waste and unnecessary expense incurred in supplying to a field an excess of one or two ingredients in order to provide that field with its minimum requirements of a third ingredient. It also reduces transportation costs and relieves the farmer of the unpleasant task of breaking up the rock-like masses in which prepared fertilizer mixes frequently come.

In the claims the word "powdered" is used to indicate either powdered or granular material.

While my invention is primarily intended to satisfy the pressing and long-recognized need of the farmer for a device of this kind, my invention is not necessarily limited to farm use in mixing and spreading fertilizers but can be applied to other purposes. Furthermore, my invention is not limited to the particular details shown and described but includes all variations, modifications, and equivalents coming within the scope of the appended claims.

I claim:

1. In a device of the class described for mixing powdered material the combination of a casing, a tubular member rotatably mounted therein, means dividing said casing into compartments arranged longitudinally of said tubular member, means for supplying different powdered materials to the several compartments in said casing, said tubular member having an opening located in each compartment, means in each compartment for covering the opening in the tubular member therein, said last mentioned means having a passage communicating with said opening, means for directing powdered material through said passage and said opening into said tubular member when said tubular member is rotated, and means for rotating said tubular member.

2. In a device for mixing and feeding powdered fertilizer ingredients comprising a casing, a tubular member rotatably mounted therein, means dividing said casing into compartments arranged longitudinally of said tubular member, said tubular member having an opening in each compartment, a hopper for holding different powdered ingredients, said hopper being divided into bins each having a lower end communicating with one of said compartments, a collar located in each compartment, each collar being attached to said tubular member for rotation therewith and having a spiral passage communicating with an opening therein, a finger provided on each collar for directing powdered materials through its passage and into said tubular member when said member is rotated, and means for rotating said tubular member and collars.

3. In a device of the class described the combination of a casing, a tubular member rotatably and removably mounted in said casing, partitions dividing said casing into compartments arranged longitudinally of said tubular member, said tubular member having an opening into each compartment, a hopper divided into bins for different powdered materials, each bin having an inclined lower end communicating with one of said compartments, a collar in each compartment, means for readily attaching and detaching each collar to said tubular member, each collar having a spiral passage therein establishing communication between one of said bins and said tubular member, a roof over said passage for preventing flow of material into said tubular member under the influence of gravity alone, and means for rotating said tubular member.

4. In a device of the class described the combination of a casing, a tubular member rotatably and removably mounted in said casing, partitions dividing said casing into compartments arranged longitudinally of said tubular member, said tubular member having an opening into each compartment, a hopper divided into bins for different powdered materials, each bin having an inclined lower end communicating with one of said compartments, a collar in each compartment, means for readily attaching and detaching each collar to said tubular member, each collar having a spiral passage therein establishing communication between one of said bins and said tubular member, a roof over said passage for preventing flow of material into said tubular member under the influence of gravity alone, said collars having passages of different capacities to supply unequal quantities of different materials to said tubular member, means for removably securing said tubular member and collars in said casing.

5. In a device of the class described comprising a casing, a tube rotatably mounted therein, a gear for driving said tube, said gear being attached to one end of said tube in said casing, means dividing said casing into compartments arranged longitudinally of said tube, said tube having an opening into each compartment, a hopper having a plurality of bins each communicating with one of said compartments, a collar located in each compartment, said collar being removably attached to said tube and controlling the quantity of material fed from its compartment through one of said openings into said tube, means detachably connecting said casing and hopper to permit removal and replacement of said collars with collars having different material feeding capacities, and slides interposed between said compartments and said bins, said slides being movable to control communication between said compartments and said bins.

6. In a device of the class described the combination of a casing, a tubular member rotatably mounted therein, means dividing said casing into compartments, means for supplying different ingredients to said compartments, said tubular member having an opening into each compartment, a collar mounted on said tubular means in each compartment covering said opening therein, said collar having a passage communicating with said opening and carrying a finger for directing material through said passage and opening into said tubular member, means for adjusting said fingers to vary the relative quantities of different ingredients supplied to said tubular member, and means for rotating said tubular member and fingers.

7. In a device of the class described the combination of a hopper having a plurality of bins for different materials, a plurality of casings attached to said hopper, each casing being divided into a plurality of compartments equal in number to the number of bins in said hopper, means connecting a compartment of each casing with each of said bins, slides for controlling communication between each of said bins and each of the casing compartments with which it communicates, a tube rotatably mounted in each casing and extending through all of the compartments therein, said tube having an opening located in each compartment, a collar mounted on said tube in each compartment and controlling the passage of the material through said opening, each collar having means for feeding material from its compartment into said tube when said tube is rotated, the feeding means of the several collars in each casing being of different capacities, and means for rotating said tubes.

8. A device of the class described comprising a casing, a tube rotatably mounted in said casing, means dividing said casing into a plurality of compartments arranged longitudinally of said tube, said tube having a pair of oppositely disposed openings in each compartment, a collar located in each compartment and surrounding said tube, each collar covering the tube openings in its compartment and having a pair of curved passages leading to said openings, and means for rotating said tube and collars, said tube being open at one end so that rotation of said tube and collars will cause material to pass from said compartment, through said passages and said openings, and through said tube.

9. A device of the class described the combination of a casing, a tube rotatably mounted therein, means dividing said casing into a plurality of compartments arranged lengthwise of said tube, a collar located in each compartment, means for attaching each collar to said tube for rotation therewith, a wear plate upon which each collar rests, said wear plates being supported by said dividing means, and means for rotating said tube and collars.

10. In a device of the class described the combination of a casing which is generally semicircular in cross section and having an open side, means dividing said casing into a plurality of compartments longitudinally arranged therein, a tube extending through said casing and each of said compartments, said tube having an opening into each of said compartments, collars insertable into said compartments through the open side of said casing, means for detachably connecting said collars to said tube for rotation therewith, a hopper attachable to the open side of said casing, said hopper having a plurality of bins each having a bottom part discharging into one of said compartments, said hopper being readily removable from said casing to permit changing of said collars, said collars having feeding means of different capacities for feeding material to said tube through said openings when the tube is rotated, and means for rotating said tube.

11. A collar of the class described comprising a cylindrical portion adapted to be connected to a tubular member, means providing a passageway through said collar, a roof extending from said collar over the portion of the passageway in the outside surface of said collar, an ear extending from said collar above said roof, a shaft carried in said roof and said ear, a movable finger attached to said shaft below said roof, means to rotate said shaft to shift said finger to control the feed of material through the passageway, and means to lock said shaft to said collar.

12. In a device of the class described for mixing powdered material, the combination of a casing, a substantially vertically disposed tubular member rotatably mounted in said casing and having an open lower end, means dividing said casing into compartments arranged longitudinally of said tubular member, means for supplying different powdered materials to the several compartments in said casing, said tubular member having an opening located in each compartment, means in each compartment for covering the opening in the tubular member therein, said last mentioned means having a passage communicating with said opening, means for directing powdered material through said passage and said opening into said tubular member when said tubular member is rotated, said material within said tubular member being pulled through the open end thereof by the force of gravity, and means for rotating said tubular member.

HOWARD G. KORNBERG.

References Cited in the file of this patent

UNITED STATES PATENTS

| Number | Name | Date |
|---|---|---|
| 371,881 | Everett | Oct. 18, 1887 |
| 555,896 | Crane | Mar. 3, 1896 |
| 692,213 | Salisbury | Jan. 28, 1902 |
| 693,527 | Love | Feb. 18, 1902 |
| 830,543 | Trump et al. | Sept. 11, 1906 |
| 857,742 | Lanquist | June 15, 1907 |
| 1,198,900 | Eggert | Sept. 19, 1916 |
| 1,489,344 | Cates | Apr. 8, 1924 |
| 2,224,797 | Pinder | Dec. 10, 1940 |
| 2,352,809 | Strauss | July 4, 1944 |